United States Patent
Schreiner et al.

(10) Patent No.: US 11,232,805 B2
(45) Date of Patent: Jan. 25, 2022

(54) METHOD AND APPARATUS FOR PROCESSING OF AUXILIARY MEDIA STREAMS EMBEDDED IN A MPEGH 3D AUDIO STREAM

(71) Applicant: DOLBY INTERNATIONAL AB, Amsterdam Zuidoost (NL)

(72) Inventors: Stephan Schreiner, Birgland (DE); Christof Fersch, Neumarkt (DE)

(73) Assignee: Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 16/970,968

(22) PCT Filed: Feb. 22, 2019

(86) PCT No.: PCT/EP2019/054432
§ 371 (c)(1),
(2) Date: Aug. 19, 2020

(87) PCT Pub. No.: WO2019/162434
PCT Pub. Date: Aug. 29, 2019

(65) Prior Publication Data
US 2020/0395027 A1 Dec. 17, 2020

Related U.S. Application Data

(60) Provisional application No. 62/634,136, filed on Feb. 22, 2018, provisional application No. 62/641,098, (Continued)

(30) Foreign Application Priority Data

Apr. 9, 2018 (EP) ..................................... 18166319

(51) Int. Cl.
*G10L 19/16* (2013.01)
*G10L 19/008* (2013.01)
(Continued)

(52) U.S. Cl.
CPC .......... *G10L 19/167* (2013.01); *G10L 19/008* (2013.01); *H04N 21/42615* (2013.01);
(Continued)

(58) Field of Classification Search
CPC ................ G10L 19/008; G10L 19/167; H04N 21/42615; H04N 21/434; H04N 21/4363;
(Continued)

(56) References Cited

U.S. PATENT DOCUMENTS 8,363,161 B2 * 1/2013 Pearlstein .......... H04N 21/4341
348/515
9,621,963 B2 * 4/2017 Master ............. H04N 21/85406
(Continued)

FOREIGN PATENT DOCUMENTS

| RU | 2563776 C2 | 9/2015 |
| WO | 2016038034 A1 | 3/2016 |

OTHER PUBLICATIONS

Plogsties; MPEG-H Audio System for Broadcasting; 2015; Fraunhofer; ITU-R Worksop "Topics on the Future of Audio in Broadcasting"; pp. 1-17.*

(Continued)

*Primary Examiner* — Peter D Le (57) ABSTRACT

The disclosure relates to methods, apparatus and systems for side load processing of packetized media streams. In an embodiment, the apparatus comprises: a receiver for receiving a bitstream, and a splitter for identifying a packet type in the bitstream and splitting, based on the identification of a value of the packet type in the bit stream into a main stream and an auxiliary stream.

18 Claims, 8 Drawing Sheets

Related U.S. Application Data filed on Mar. 9, 2018, provisional application No. 62/697,536, filed on Jul. 13, 2018.

(51) Int. Cl.
  *H04N 21/426* (2011.01)
  *H04N 21/434* (2011.01)
  *H04N 21/4363* (2011.01)
  *H04N 21/439* (2011.01)

(52) U.S. Cl.
  CPC ....... *H04N 21/434* (2013.01); *H04N 21/4363* (2013.01); *H04N 21/4394* (2013.01)

(58) Field of Classification Search
  CPC ........... H04N 21/4394; H04N 21/4852; H04N 21/8106
  See application file for complete search history.

(56) References Cited

U.S. PATENT DOCUMENTS

| | | | | |
|---|---|---|---|---|
| 9,674,453 | B1* | 6/2017 | Tangeland | H04S 7/30 |
| 9,788,133 | B2* | 10/2017 | Sen | G10L 19/167 |
| 9,854,375 | B2 | 12/2017 | Stockhammer | |
| 10,158,927 | B1* | 12/2018 | Lei | H04N 21/4307 |
| 10,171,849 | B1* | 1/2019 | Hwang | H04N 21/816 |
| 11,006,181 | B2 | 5/2021 | Murtaza | |
| 2001/0009548 | A1* | 7/2001 | Morris | H04N 21/4344 370/392 |
| 2005/0238330 | A1* | 10/2005 | Abe | G11B 20/1208 386/248 |
| 2006/0056802 | A1* | 3/2006 | Seo | G11B 27/11 386/323 |
| 2009/0284583 | A1* | 11/2009 | Hwang | H04N 13/161 348/43 |
| 2011/0170839 | A1* | 7/2011 | Adolph | G11B 27/105 386/241 |
| 2013/0124994 | A1* | 5/2013 | Chen | G06F 16/40 715/716 |
| 2015/0043752 | A1 | 2/2015 | Ito | |
| 2015/0189337 | A1* | 7/2015 | Pedan | H04L 65/4084 370/474 |
| 2016/0232910 | A1* | 8/2016 | Fischer | G10L 19/167 |
| 2016/0248870 | A1* | 8/2016 | Tsukagoshi | H04L 65/605 |
| 2016/0301934 | A1 | 10/2016 | Su | |
| 2016/0344789 | A1* | 11/2016 | Watts | H04L 65/607 |
| 2016/0381399 | A1* | 12/2016 | Brondijk | H04N 21/235 725/116 |
| 2017/0063960 | A1* | 3/2017 | Stockhammer | H04N 21/44209 |
| 2017/0162206 | A1* | 6/2017 | Tsukagoshi | G10L 19/018 |
| 2017/0221496 | A1 | 8/2017 | Grant | |
| 2017/0223429 | A1 | 8/2017 | Schreiner | |
| 2017/0230693 | A1* | 8/2017 | Thoma | H04L 65/607 |
| 2018/0012610 | A1 | 1/2018 | Riedmiller | |
| 2018/0033443 | A1 | 2/2018 | Chon | |
| 2018/0054634 | A1* | 2/2018 | Tsukagoshi | H04N 21/43635 |
| 2018/0103082 | A1* | 4/2018 | Tsukagoshi | H04L 65/607 |
| 2018/0115789 | A1* | 4/2018 | Tsukagoshi | H04H 60/37 |
| 2019/0037255 | A1* | 1/2019 | Tsukagoshi | H04N 21/23805 |
| 2019/0104326 | A1* | 4/2019 | Stockhammer | H04L 67/02 |
| 2019/0115009 | A1* | 4/2019 | Misra | H04N 21/2362 |
| 2019/0230420 | A1* | 7/2019 | Negishi | H04N 21/8547 |
| 2020/0278828 | A1* | 9/2020 | Murtaza | G02B 27/0179 |

OTHER PUBLICATIONS

Herre; MPEG-H 3D Audio; 2015; IEEE; IEEE Journal of Selected Topics in Signal Processing, vol. 9, No. 5; pp. 1-10.*
"Text of ISO/IEC 23008-3: 2015/DAM5, Audio Metadata Enhancements" MPEG Meeting, Jan. 2018, p. 15, p. 23.
Bleidt, R. et al "Development of the MPEG-H TV Audio System for ATSC 3.0" IEEE Transactions on Broadcasting, vol. 63, No. 1, Mar. 1, 2017, pp. 202-236.
DVB Organization: "A342-2-2017-AC-4-System-4" DVB, Digital Video Broadcasting, Ancienne Route, Geneva, Switzerland, Dec. 7, 2017.
DVB Organization: "A342-3-2017-MPEG-H System-2" DVB Digital Video Broadcasting Geneva Switzerland, Nov. 2, 2017.
ETSI TS 103 190 V1.1.3 Mar. 2014.
ISO/IEC 14496-3 "Information Technology—Coding of Audio-Visual Objects" Sep. 2009.
ISO/IEC 23008-3 (MPEG-H 3D Audio, 2nd Edition); Feb. 2019.
ATSC Standard: A/342 Part 3, MPEG-H System, Doc. 1/342-3:2017, Advanced Television Systems Committee, Mar. 3, 2017.

* cited by examiner

FIGURE 3 – No Stream Splitter available in Device #3

FIG. 6

METHOD AND APPARATUS FOR PROCESSING OF AUXILIARY MEDIA STREAMS EMBEDDED IN A MPEGH 3D AUDIO STREAM

CROSS-REFERENCE TO RELATED APPLICATIONS

This application claims priority of the following priority applications: U.S. provisional application 62/634,136, filed 22 Feb. 2018, U.S. provisional application 62/641,098, filed 9 Mar. 2018, EP application 18166319.6, filed 9 Apr. 2018 and U.S. provisional application 62/697,536, 13 Jul. 2018 which are hereby incorporated by reference.

TECHNICAL FIELD

The present disclosure relates to providing an apparatus, system and method for packetized media processing.

DETAILED DESCRIPTION

For home Consumer Electronics (CE) installations, functionality can be spread over several devices (e.g., set-top boxes, TV-sets, AVR-receivers), where such devices are connected via standardized interfaces (e.g. HDMI).

A first device can receive media streams from broadcast and/or broadband connections. That first device can additionally have sophisticated intelligence (e.g. "smart speaker" functionality). A second device can be dedicated to media decoding, rendering and presentation to users.

Typically, a media program is received by device #1 and sent to device #2 for reproduction. This media program may be known as the "Main program". From time to time or in addition, a different media program (like an advertisement) received from a different transmission channel or media generated by the "Smart device" capability in device #1, both generally represented in a different media format, shall be inserted or overlaid into the main media program.

This can be accomplished by decoding both the main and the auxiliary program into a generalized, typically uncompressed representation, switching the streams or mixing/rendering both into a combined representation and re-encoding the generated media stream into an encoded transmission format. This method can be performed in any device, such as all performed in device #1. However, high computational power may be required while the rendering stages and the intermediate representation may not provide optimal matching of the actual reproduction system in device #2.

Figure 1:
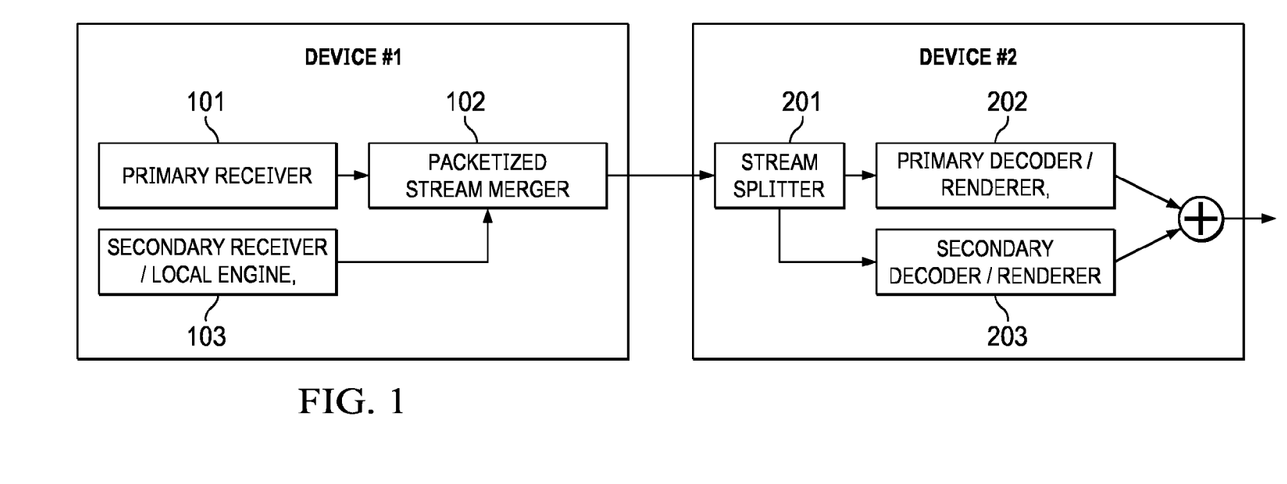
FIG. 1 illustrates two exemplary devices.

FIG. 1 illustrates an exemplary device #1 and an exemplary device #2. Device #1 may include a primary receiver 101, a secondary receiver/local engine 103 and a packetized stream merger 102. The packetized stream merger 102 may merge data streams received from the primary receiver 101 (e.g., the main stream) and from the secondary receiver/local engine 103 (e.g., the auxiliary data stream). The device #2 may include a stream splitter 201, a primary decoder/renderer 202 and a secondary decoder/renderer 203. The stream splitter 201 may split streams such as a main stream (that may be provided then to a primary decoder/renderer 202) and an auxiliary stream (that may then be provided to the secondary decoder/renderer 203). Both decoder output signals may be presented to the listener simultaneously.

To overcome the limitation described above, device #1 can directly send the incoming main media stream to device #2. This mode of device #1 can be called "pass-through" mode. However, the downside of this approach is that standardized interfaces are only specified to convey one single data stream for video and audio, and therefore the second media stream can't be sent natively over the interface to device #2 for reproduction.

The present invention may provide for methods and apparatus for a first receiver for receiving packetized media data, a secondary receiver for receiving an additional media stream and a transmitter interface for sending packetized media data.

This invention proposes to merge the second auxiliary media stream into the packetized main media stream by the following means.

Media streams represented as packetized streams typically use packet type identifiers to differentiate multiple sub-streams with the overall media stream. To convey additional (media) data not related to the main media stream, the first device #1 can encapsulate the additional data in packets formatted according to the main media stream but labeled by a dedicated tag in the packet header. This dedicated tag will trigger the receiving device #2 to strip out the packets carrying the additional media stream. Optionally, device #2 may then provide the additional media stream to a secondary decoder/renderer 203 instance while the main stream simultaneously being received by the primary decoder/renderer 202.

In one example, legacy receiving devices that do not recognize this new tag in the packet header for additional encapsulated media streams are already expected to disregard those packets.

The tag may be provided in any encoded audio data stream environment, such as MPEG-H, AC-4, Dolby Digital+, etc.

If additional inserted data streams exceed a substantial data rate compared to the original media stream, a receiver device should filter the incoming packetized stream and optionally strip out the additional data packets to maintain the receiver buffer model of the downstream connected (legacy) media decoder.

Figure 3:
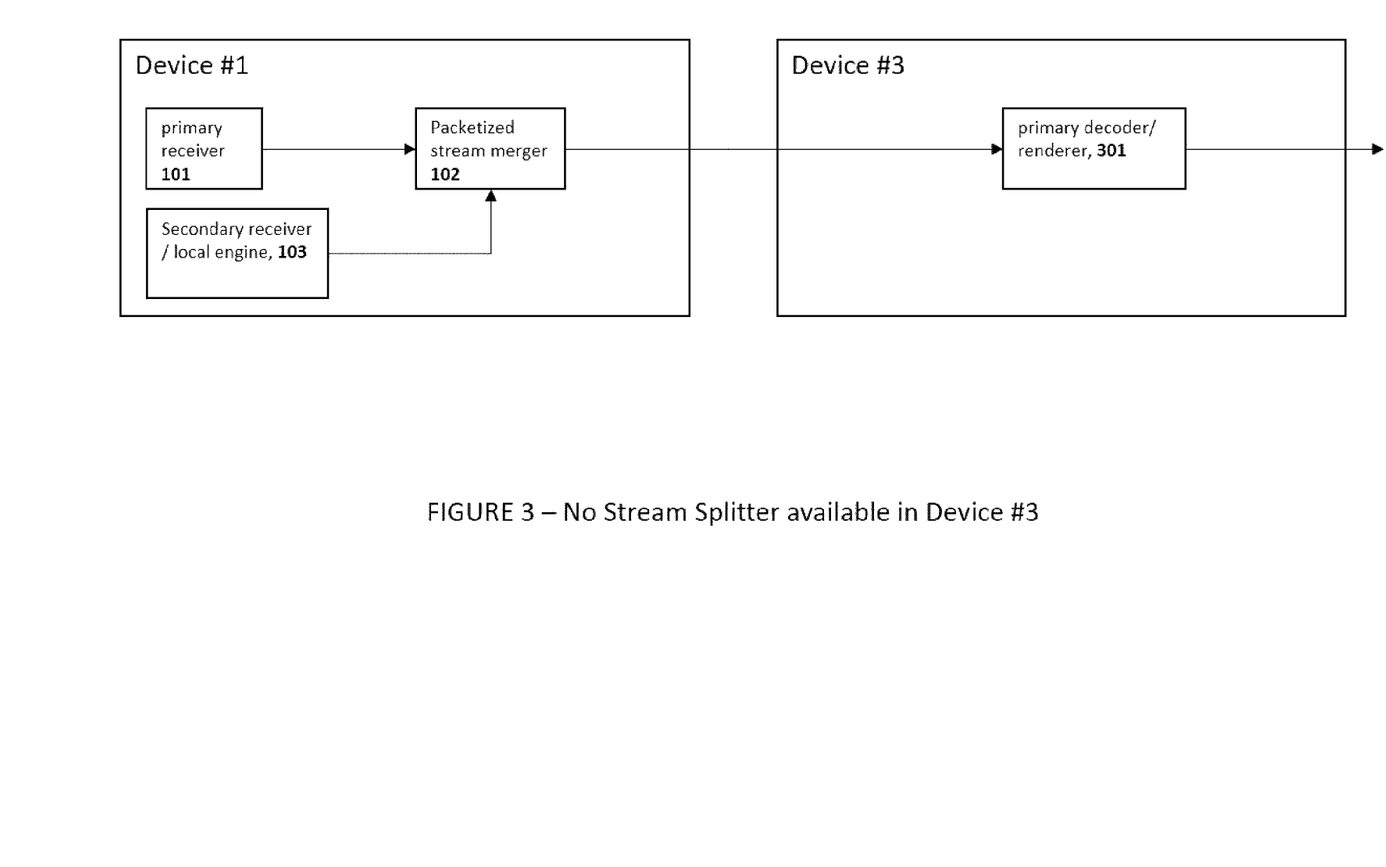
FIG. 3 illustrates two exemplary devices.

Further, FIG. 3 illustrates an exemplary device #1 and an exemplary device #3. Device #1 may include a primary receiver 101, a secondary receiver/local engine 103 and a packetized stream merger 102. The packetized stream merger 102 may merge data streams received from the primary receiver 101 (e.g., the main stream) and from the secondary receiver/local engine 103 (e.g., the auxiliary data stream). The device #3 may only include a primary decoder/renderer 301, but not a stream splitter. In one example, it might not be possible to provide an auxiliary stream to a secondary decoder/renderer. In this example, a modified primary decoder might decode/convert/mix an auxiliary stream with the main stream internally.

MPEG-H Ecosystem

MPEG-H 3d Audio according to ISO/IEC 23008-3 is encapsulated in a MHAS format. This format utilized a packetized format where each packet consists of a packet header and a packet payload. While the payload can be any binary data, the header specifies the type and the length of the payload. (The additionally available label can be used differentiate multiple instances, but is not utilized here.)

By assigning a new MHAS packet type for the secondary media stream (exemplatorily named PACTYP_MEDIA), additional audio data represented either as uncompressed PCM data, optionally further specified using the RIFF/WAV format, or compressed audio data such as MPEG-4 audio according to ISO/IEC 14496-3 or any other encoded representation (e.g. according to ATSC A/52 or ETSI TS 103 190) can be encapsulated into MHAS packets and thus can be merged into the main MPEG-H 3d Audio stream. The different formats to be encapsulated can be differentiated by either different packet types (e.g. PACTYP_PCM, PACTYP_MPEG4AUDIO, . . . ) or, as show in the example below, by an additional specifier forming a sub-header of the MHAS packet.

Since (media) data may require configuration data but may not be represented as self-contained streams, this data may be encapsulated in the header of the container MHAS packet, or an additional MHAS packet (e.g. PACTYP_MEDIA_CONFIG or another type of MHAS packet name indicating configuration, such as PACTYP_PCMCONFIG) may be assigned, which, in addition, may also carry the information on the type of the additional data. The MHAS packet type may carry configuration information for PCM payload data for feeding the configuration information to the decoder. For example, if an MHAS packet type for configuration information (e.g., PACTYP_MEDIA_CONFIG or PACTYP_PCMCONFIG) is present in the bitstream (e.g., after PACTYP_MEDIA_CONFIG), PCT data confirguration information in the form of a data structure (e.g., pcmDataConfig( )) may be fed to a decoder.

In general, an MHAS packet type (e.g., PACTYP_PCMDATA) may be used to embed PCM payload data corresponding to PCM signals defined in the configuration structure and to feed PCM data in the form of a PCM data payload structure to the decoder. If the MHAS packet type (e.g., PACTYP_PCMDATA) is present in the bitstream, the PCM data payload structure (e.g., pcmDataPayload( )) may be used during decoding.

Figure 2:
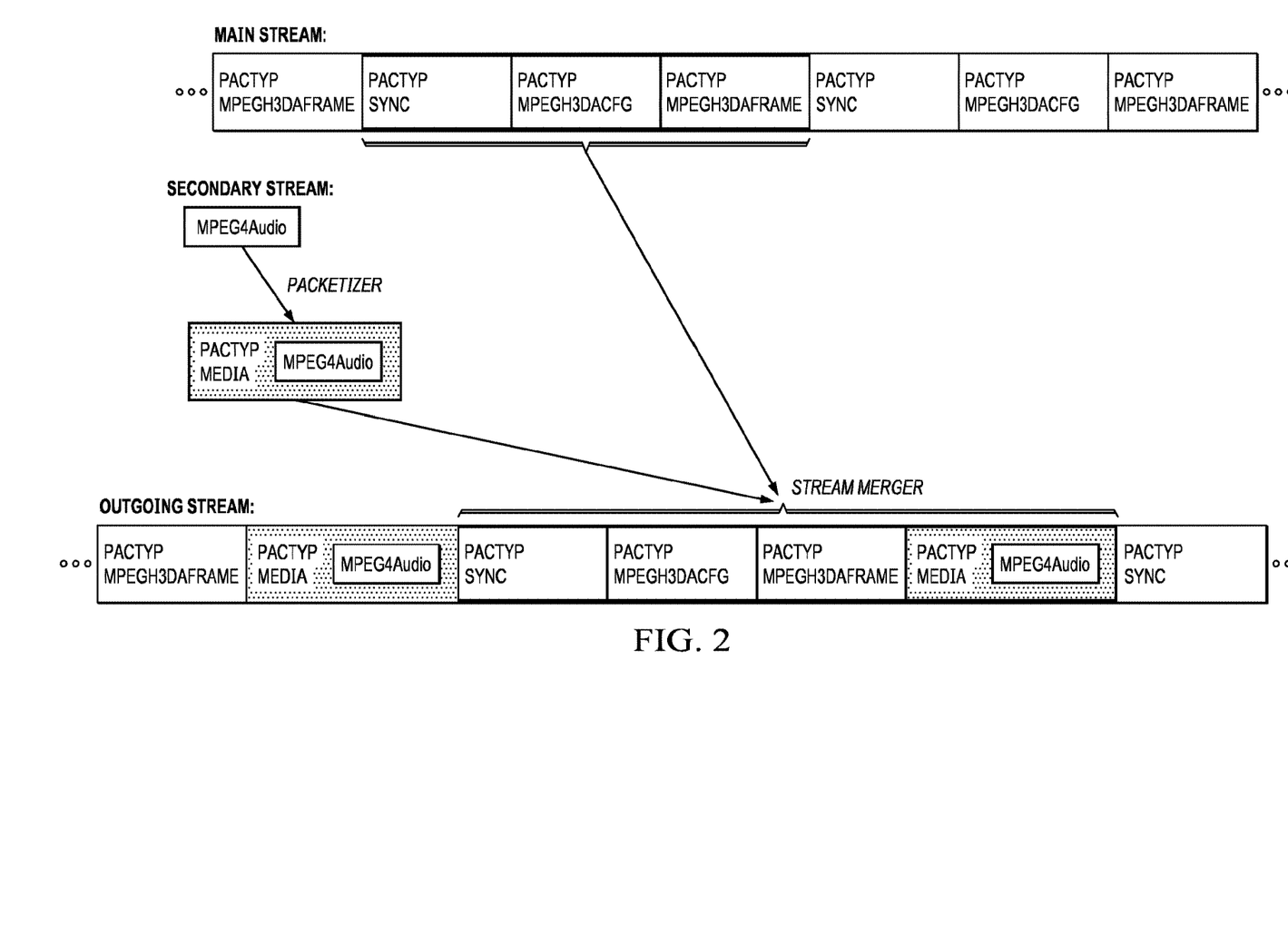
FIG. 2 illustrates an exemplary MPEG-H 3D audio packet stream in accordance with the present invention.

FIG. 2 illustrates an exemplary MPEG-H 3D audio packet stream in accordance with the present invention.

In one example, the present invention may be based on identifying information based on the following syntax amendments:

1) Amend table 220—Syntax of MHASPacketPayload( ) with:

| Syntax | No. of bits | Mnemonic |
|---|---|---|
| MHASPacketPayload(MHASPacketType) { | | |
| ... | | |
| switch(MHASPacketType) { | | |
| ... | | |
| case PACTYP_MEDIA: | | |
| mhasMediaDataType; | 8 | uimsbf |
| For (i=0; i< MHASPacketLength; i++) { | | |
| mhas_media_data_byte[i]; | 8 | bslbf |
| } | | |
| ... | | |
| } | | |
| ... | | |
| } | | |

2) Assign an appropriate MHASPacketType for PACTYP_MEDIA in table 223. Alternatively, the value of MHASPacketType may be vary or may depend on a preset value, e.g., a value that is published by a standards organization in the final standards document.

3) The following media type should be specified using the mhasMediaDataType enumeration:

| Value of mhasMediaDataType | Format used for mhas_media_data_byte | |
|---|---|---|
| 0 | RIFF/WAV | |
| 1 | MPEG-1/2 Layer1, 2, 3 | as specified in ISO/IEC 11172-3, ISO/IEC 13818-3 |
| 2 | MPEG-4 Audio in LATM | AudioMuxElement(1); as specified in ISO/IEC 14496-3 |
| 3 | Dolby Digital, Dolby Digital Plus | as specified in ETSI TS 102 366 |
| 4 | MPEG-2/4 AAC in ADTS | as specified in ISO/IEC 13818-7, ISO/IEC 14496-3 |
| 5 | Dolby AC-4 | as specified in ETSI TS 103 190 |
| 6 | Text-to-speech | As used for TTS engines as examplatory constrained in IEC 62731 |
| 7-255 | reserved | |

FIG. 2 exemplarily shows a packetized main stream including exemplary packets according to MPEG-H 3D audio with 3D audio data (exemplarily including configuration data e.g. PACTYP_MPEGH3DACFG, as metadata, and coded audio data, e.g. PACTYP_MPEGH3DAFRAME).

Furthermore, FIG. 2 exemplarily shows a packetized secondary stream (auxiliary stream) including exemplary packets in accordance with the invention, as being indicated by header information referring to the above-described exemplary additional packet type PACTYP_MEDIA including additional audio data (auxiliary audio data/secondary audio data), exemplarily in compressed format, e.g. MPEG4Audio.

Alternatively or additionally, the additional audio data can be packeted into a packet having the header in accordance with the format of the packetized main stream, here exemplarily MPEG-H 3D audio, including a sub-header indicative of the different formats encapsulated as discussed above.

In accordance with exemplary aspects of the invention, the main stream and the auxiliary (secondary) stream can be merged by a stream merger, such as e.g. by a packetized stream merger 102.

The outgoing stream (merged stream) includes packets relating to the encoded audio data of the main stream and packets relating to the audio data of the auxiliary stream within a single packetized bitstream of a same format (such as exemplarily MPEG-H 3D audio in FIG. 2).

It may be noted that non-modified (legacy) MPEG-H 3D audio decoders may not understand the newly added packet type (e.g. PACTYP_MEDIA) and such non-modified (legacy) MPEG-H 3D audio decoders may ignore or dump packets having the newly added packet type (e.g. PACTYP_MEDIA) indicated in their header. Such non-modified (legacy) MPEG-H 3D audio decoders can still decode the audio data relating to the main stream but would not process the additional auxiliary/secondary audio data.

For decoding and processing the merged stream with main and auxiliary stream, decoder devices can be modified to include a modified decoder enabled to filter and decode/process the packets related to the auxiliary audio data.

Figure 4:
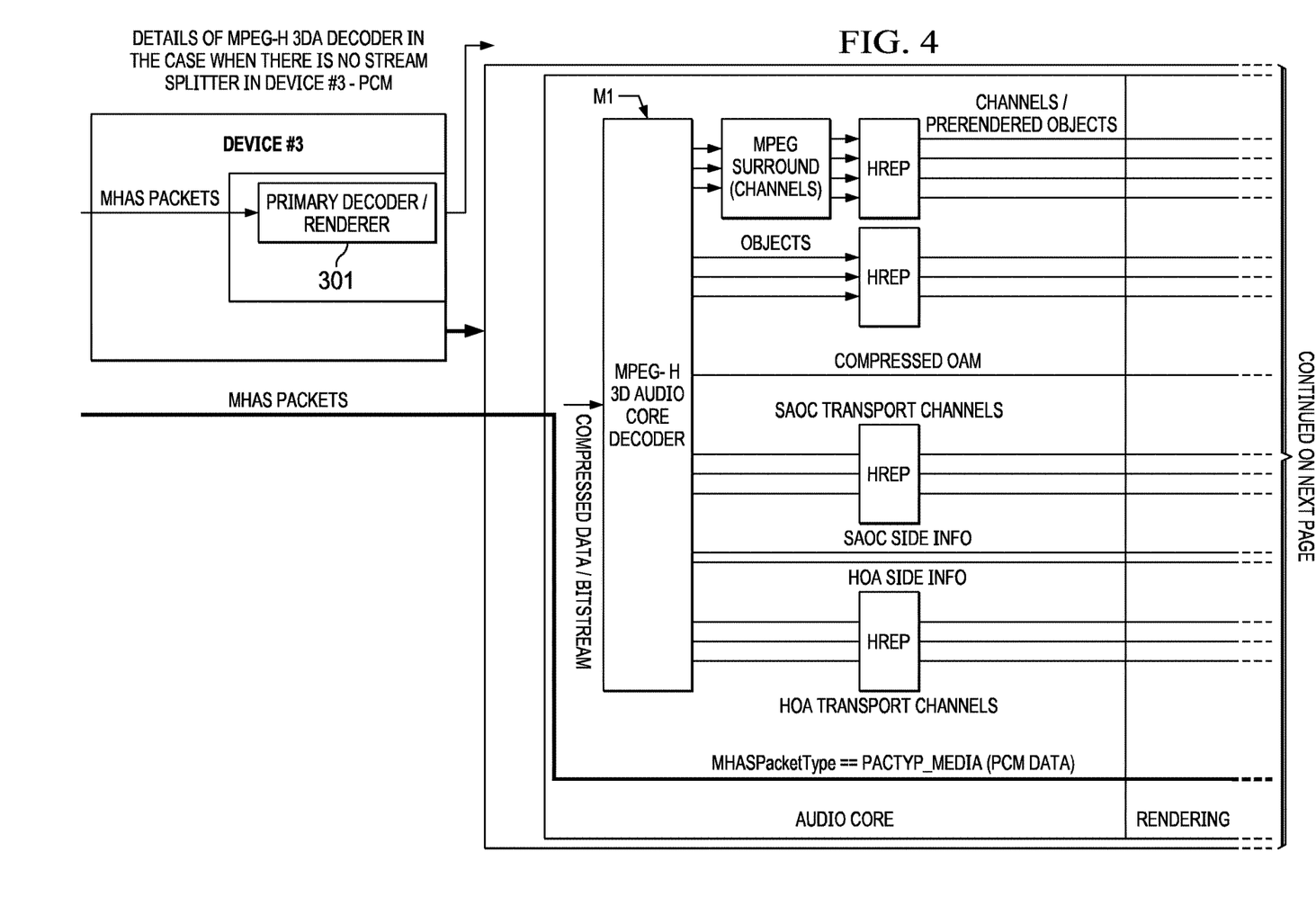
FIG. 4 illustrates an example of a primary decoder/renderer in accordance with the present invention.

FIG. 4. Schematically illustrates another example of a primary decoder/renderer in accordance with the present invention.

FIG. 4 illustrates how this might be achieved in an MPEG-H 3D Audio decoder, where the media format is PCM data. Exemplarily, the primary decoder/renderer 301 is realized as including an MPEG-H 3D Audio Core Decoder M1 and related rendering units such as object renderer M2, e.g. such as defined according to MPEG-H 3D audio (ISO/IEC 23008-3) standard.

The modified decoder 301 might additionally filter and strip out the MHAS packets having a header indicating the new additional packet type (e.g. PACTYP_MEDIA), and input the packets having the auxiliary audio data to a format conversion unit 301c1 and then to a sample rate converter (such as exemplarily the sample rate converter M3 present in the decoder architecture downstream of the MPEG-H 3D Audio Core Decoder M1 as defined according to MPEG-H 3D audio (ISO/IEC 23008-3) standard).

Accordingly, the modified decoder 301 might perform sample rate conversion (e.g. by sample rate converter M3) and format conversion (e.g. by format conversion unit 301c1) on the input media data (MHASPacket-Type==PACTYP_MEDIA) in order to match the media sampling rate and channel layout to the output sampling rate and channel configuration of the decoder. Further, a modified decoder might mix input media data or the sampling-rate-converted input media data with the audio media data that have been created by the MPEG-H 3D Audio Core Decoder M1 in a mixer (such as exemplarily the mixer unit M4 present in the decoder architecture downstream of the MPEG-H 3D Audio Core Decoder M1 as defined according to MPEG-H 3D audio (ISO/IEC 23008-3) standard).

The above example of FIG. 4 exemplarily relates to auxiliary media data including uncompressed media data, such as PCM data or the like. It is to be noted that, if the uncompressed media data, such as PCM data or the like, further includes positional information or is related to corresponding positional metadata, e.g. for 3D audio appliances, the auxiliary data can be further processed by a positional data processing object renderer, such as the object renderer M2 present in the decoder architecture downstream of the MPEG-H 3D Audio Core Decoder M1 as defined according to MPEG-H 3D audio (ISO/IEC 23008-3) standard.

Figure 5:
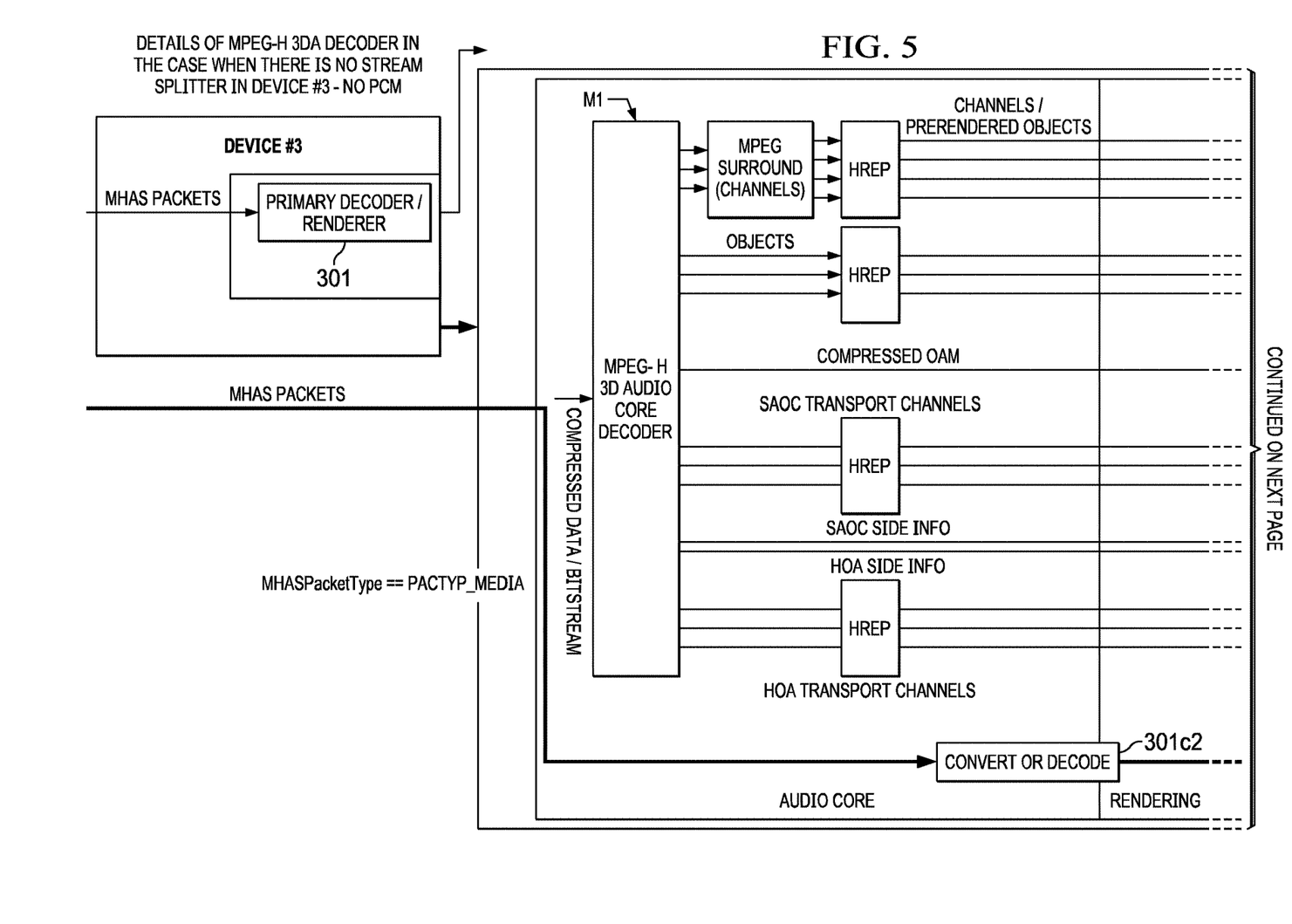
FIG. 5 illustrates yet another example of a primary decoder/renderer in accordance with the present invention.

FIG. 5. Schematically illustrates yet another example of a primary decoder/renderer in accordance with the present invention. Exemplarily, the primary decoder/renderer 301 is realized as including an MPEG-H 3D Audio Core Decoder M1 and related rendering units such as object renderer M2, e.g. such as defined according to MPEG-H 3D audio (ISO/IEC 23008-3) standard.

FIG. 5 exemplarily illustrates how the above might be achieved in an MPEG-H 3D Audio decoder, where the media format is encoded data (such as MPEG-4 Audio). A modified decoder 301 might decode the input media data (MHASPacketType==PACTYP_MEDIA) using an additional decoder 301c2 (converter and/or decoder configured to convert and/or decode the auxiliary media data), not necessarily specified within ISO/IEC 23008-3. Further, a modified decoder might mix those decoded media data with the audio media data that have been created by the MPEG-H 3D Audio Core Decoder M1 as defined according to MPEG-H 3D audio (ISO/IEC 23008-3) standard.

Time-Alignment of Multiple MHAS Substream Originating from Different Sources

In exemplary aspects in accordance with the present invention, additional time-alignment units may be provided for time-alignment of the packets of the auxiliary stream, e.g. to provide time-alignment of multiple MHAS substreams originating from different sources.

Per section 14.6 of ISO/IEC 23008-3, MHAS "substreams are generated by the same encoder [and therefore] it is presumed that various incoming streams [ . . . ] are completely aligned and have no phase offset". In this case, alignment of a frame may be accomplished using the MHASPacketLabel number. With the proposed method in this invention, the above constraint can no longer be taken for granted. With different frame durations for different codecs or sampling rates, the time offset of consecutive MHAS packets of the secondary stream that is merged with the MHAS main stream varies over time. In each particular time slot, the timing offset of the secondary stream to the main stream needs to be signaled. For example, in associated packets of the auxiliary stream indicating a packet type relating to metadata associated with media data contained in the payload of packets of the auxiliary stream as shown in FIG. 6.

Figure 6:
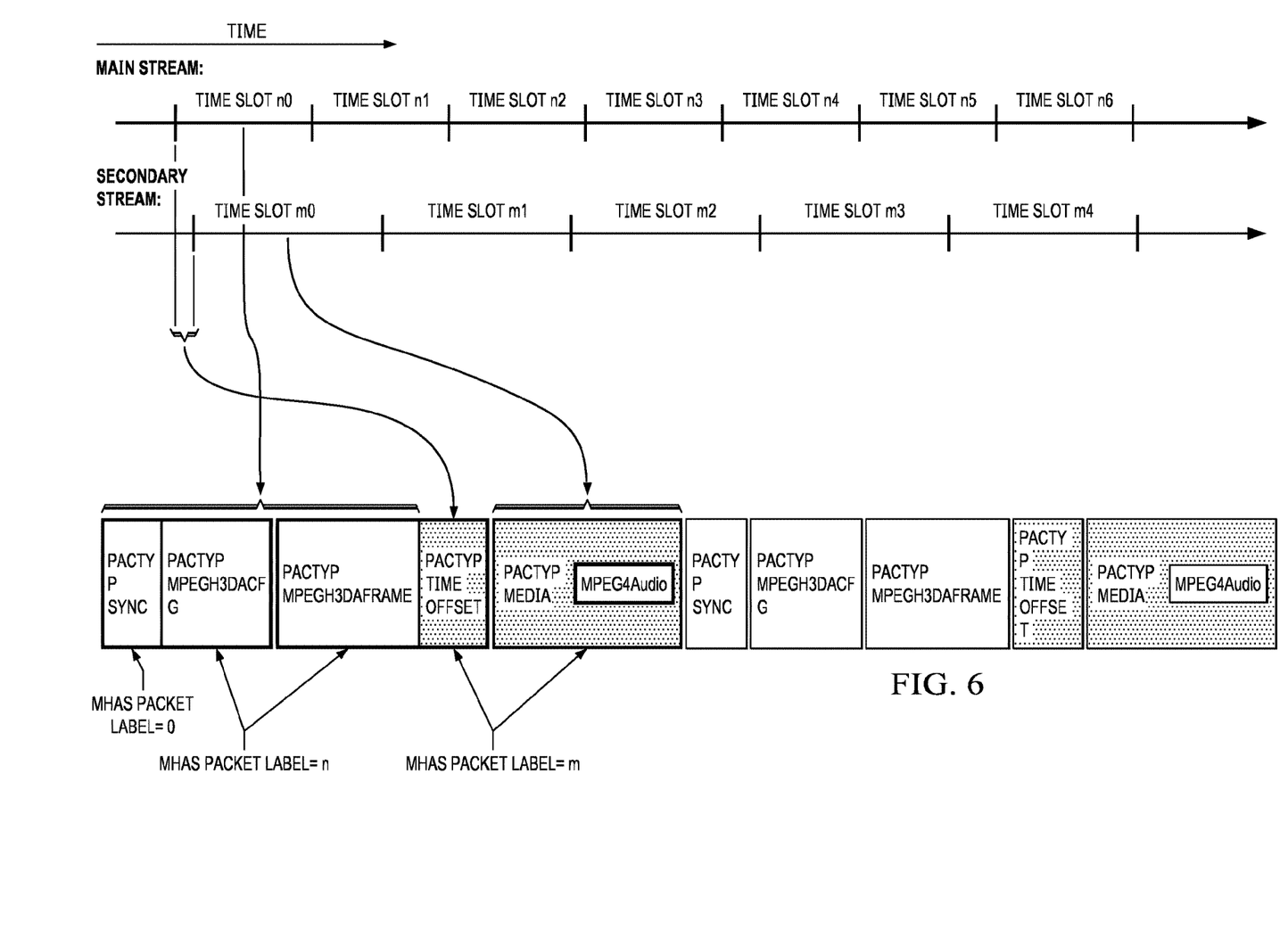
FIG. 6 illustrates exemplary packet types for achieving the means of this invention based on MHAS, for example where another MHAS packet type is defined to carry appropriate time offset signaling.

FIG. 6 illustrates exemplary packet types for achieving the means of this invention based on MHAS, for example where another MHAS packet type is defined to carry appropriate time offset signaling. To link this signaling to the corresponding stream, the time offset packet needs to have the same MHASPacketLabel number assigned as the MHASPacket of type PACTYP_MEDIA it refers to. From FIG. 6, it is obvious that a direct one-to-one relation of stream data corresponding to one particular time slot of each stream is not guaranteed, but two or more time slots from one stream may correspond to one time slot from the other stream in a timely manner.

Another option for signaling time offset is to add this time offset to the MHAS packet of type PACTYP_MEDIA itself.

In view of the above, in some exemplary aspects in accordance with the present invention, the conversion and/or decoding unit of the modified primary decoder/renderer 301 of the examples of FIGS. 4 and/or 5 may include a time-alignment unit for time-alignment of the auxiliary stream data with the main stream data, e.g. upstream of the mixer such as mixer unit M4 of the examples of FIGS. 4 and 5, or also upstream of the sampler (e.g. sample rate converter M3) of the examples of FIGS. 4 and 5, or also as a part of the secondary decoder/renderer 203 of the example of FIG. 1.

Control of Mixing of Main and Secondary Audio Streams

Additional data to control the mixing of the secondary (auxiliary) audio stream to the main audio streams may be required. Among other options, this data may include static gains or a dynamic gain sequences, examplatory formed as ISO/IEC 23003-4 DynamicRangeControl data to process the main stream when the secondary audio stream is reproduced. Those data are typically generated by device #1 and may be incorporated into the stream by either separate MHAS packets (e.g. with the identifier PACTYP_MPEGH_MEDIA_CFG), as further addition to the secondary stream header or by any other kind of stream encapsulation.

In view of the above, in some exemplary aspects in accordance with the present invention, the conversion and/or decoding unit of the modified decoder 301 of the examples of FIGS. 4 and/or 5 may include a gain adjustment unit for applying static and/or dynamic gains (e.g. for loudness adjustment), e.g. upstream of the mixer such as mixer unit M4 of the examples of FIGS. 4 and 5, or also upstream of the sampler (e.g. sample rate converter M3) of the examples of FIGS. 4 and 5, or also as a part of the secondary decoder/renderer 203 of the example of FIG. 1.

Dolby Ecosystem

Further, Dolby AC-4 (ETSI TS 103 190) and Dolby Digital and Dolby Digital Plus (ETSI TS 102 366) offer the possibility to carry any binary data in EMDF Payloads, which can be used to carry the same or similar data as defined in the above section (MPEG-H Ecosystem).

For such purposes, the syntax element emdf_info( ) as defined in ETSI TS 103 190 or the syntax element emdf_container( ) as defined in ETSI TS 102 366, Annex H and their underlying elements may be used. In order to do this, one can simply define on or more emdf_payload_id definitions, which can be used in order to identify the binary data which has the same or similar format as described above under PACTYP_MEDIA and/or PACTYP_MPEGH_MEDIA_CFG.

System sound mixing for media streams containing uncompressed/uncoded data may be achieved similar in Dolby AC-4 or Dolby Digital/Dolby Digital Plus as shown in FIG. 4 and FIG. 5, with the difference that the distinction which signal path to use would not be taken based on the MHASPacketType, but on the emdf_payload_id-value.

Media streams addressed by this invention, both the main stream and the side-data streams may be of the following type:
Audio streams, both compressed and uncompressed
Video streams
subtitles The invention may be also applied to video presenting devices (monitors) where an overlay picture, video or text shall be send in addition to the main (typically compressed video stream) over a standardized interface connection.

REFERENCES

US20170223429A1, EP3149955A1
ISO/IEC 23008-3: (MPEG-H 3d Audio, 2nd Edition)
Enumerated exemplary embodiments of the disclosure relate to:
EEE1. A method for audio signal processing, comprising: receiving a merged packetized media bitstream which includes packets associated with a main stream indicative of main audio information and packets associated with an side-data stream indicative of auxiliary audio information, identifying a value of a packet type in header information of packets of the merged packetized media bitstream, and splitting the merged packetized media bitstream, based on the identification of the value of the packet type in header information of packets of the merged packetized media bitstream, into the main stream indicative of main audio information and the side-data stream indicative of auxiliary audio information.
EEE2. The method of EEE1, further comprising: mixing an audio output signal based on an output signal obtained from the main audio information of the main stream and the output signal obtained from the auxiliary audio information of the side-data stream.
EEE3. The method of EEE 2, wherein output signals from the main and auxiliary audio information are output simultaneously to a listener.
EEE4. The method EEE1, further comprising: decoding the main stream by a primary decoder.
EEE5. The method of EEE1, further comprising: decoding, when the side-data stream relates to compressed auxiliary audio information, the side-data stream by a secondary decoder.
EEE6. The method of EEE1, further comprising: converting, when the side-data stream relates to compressed auxiliary audio information, media data included in packets of the side-data stream by a converter.
EEE7. The method of EEE5 or EEE6, wherein the compressed auxiliary audio information includes MPEG-4 audio data.
EEE8. The method of EEE1, wherein the side-data stream relates to uncompressed auxiliary audio information.
EEE9. The method of EEE8, wherein the uncompressed auxiliary audio information includes PCM data.
EEE10. The method of EEE1, wherein the packet type indicates an internal raw format, in particular a decoder-internal raw format.
EEE11. The method of EEE1, further comprising: performing signal processing on the side-data stream.
EEE12. The method of EEE11, wherein performing signal processing on the side-data stream is performed prior to mixing an audio output signal based on an output signal obtained from the main audio information of the main stream and the output signal obtained from the auxiliary audio information of the side-data stream.
EEE13. The method of EEE11, wherein performing signal processing on the side-data stream includes performing gain adjustment.
EEE14. The method of EEE13, wherein gain adjustment is performed based on a static gain or a dynamic gain.
EEE15. The method of EEE13, further comprising: receiving mixing information relating to at least one of static gain(s) or dynamic gain(s).
EEE16. The method of EEE13, wherein gain adjustment is performed for loudness adjustment.
EEE17. The method of EEE11, wherein performing signal processing on the side-data stream includes performing time-alignment.
EEE18. The method of EEE17, wherein performing time-alignment is performed for time-aligning the auxiliary audio information of the side-data bitstream with the main audio information of the main bitstream.
EEE19. The method according of EEE17 or EEE18, further comprising: receiving time-alignment information regarding time-alignment of the auxiliary audio information of the side-data bitstream with the main audio information of the main bitstream.
EEE20. The method of EEE1, wherein the packet type is defined to carry time offset signaling, in particular for time-alignment.
EEE21. The method EEE1, further comprising: receiving an indication of a timing offset of the side-data stream to the main stream.
EEE22. The method EEE11, wherein performing signal processing on the side-data stream includes object rendering when the auxiliary audio information is associated with positional information.
EEE23. The method EEE 22, wherein object rendering is performed by an object renderer performing object rendering for the main and side-data streams.
EEE24. The method of EEE11, wherein performing signal processing on the side-data stream includes format conversion.

EEE25. The method of EEE1, further comprising:
decoding the main stream by a standardized MPEG-H 3D audio decoder.

EEE26. The method of EEE25, further comprising:
mixing media data contained in packets of the side-data stream with media data generated by the standardized MPEG-H 3D audio decoder.

EEE27. The method of EEE26, wherein
the media data contained in packets of the side-data stream is uncompressed data, in particular PCM data, or compressed data, in particular MPEG4 audio data.

EEE28. The method of EEE26, wherein
media data contained in packets of the side-data stream is decoded by a decoder not standardized in MPEG-H 3D audio.

EEE29. The method of EEE1, wherein
the merged packetized media bitstream includes MHAS packets.

EEE30. A method for audio signal processing, comprising:
receiving a main stream indicative of main audio information;
generating, based on auxiliary audio information, or receiving the side-data stream indicative of the auxiliary audio information, and
merging the main stream and the side-data stream to generate a merged packetized media bitstream which includes packets associated with a main stream indicative of main audio information and packets associated with an side-data stream indicative of auxiliary audio information.

EEE31. The method of EEE30, further comprising
packetizing media data indicative of the auxiliary audio information into packets of the format of the merged packetized media bitstream.

EEE32. The method of EEE30, wherein
the side-data stream relates to compressed auxiliary audio information.

EEE33. The method of EEE32, wherein
the compressed auxiliary audio information includes MPEG-4 audio data.

EEE34. The method of EEE30, wherein
the side-data stream relates to uncompressed auxiliary audio information.

EEE35. The method of EEE34, wherein
the uncompressed auxiliary audio information includes PCM data.

EEE36. The method of EEE30, wherein
header information of packets of the merged packetized media bitstream is indicative of a packet type.

EEE37. The method of EEE36, wherein
a value of the packet type of packets associated with the side-data stream indicative of auxiliary audio information is indicative of media data associated with the auxiliary audio information.

EEE38. The method of EEE30, wherein
the merged packetized media bitstream includes MHAS packets.

EEE39. An apparatus for audio signal processing, comprising:
a receiver configured to receive a merged packetized media bitstream which includes packets associated with a main stream indicative of main audio information and packets associated with an side-data stream indicative of auxiliary audio information, and
a splitter configured to split the merged packetized media bitstream, based on an identification of a value of a packet type in header information of packets of the merged packetized media bitstream, into the main stream indicative of main audio information and the side-data stream indicative of auxiliary audio information.

EEE40. Apparatus of EEE39, further comprising:
a mixer configured to mix an audio output signal based on an output signal obtained from the main audio information of the main stream and the output signal obtained from the auxiliary audio information of the side-data stream.

EEE41. Apparatus of EEE39, further comprising:
a primary decoder configured to decode the main stream.

EEE42. Apparatus of EEE39, further comprising:
a secondary decoder configured to decode, when the side-data stream relates to compressed auxiliary audio information, the side-data stream.

EEE43. Apparatus of EEE39, further comprising:
a converter configured to convert, when the side-data stream relates to compressed auxiliary audio information, media data included in packets of the side-data stream.

EEE44. Apparatus of EEE42 or EEE43, wherein
the compressed auxiliary audio information includes MPEG-4 audio data.

EEE45. Apparatus of EEE39, wherein
the side-data stream relates to uncompressed auxiliary audio information.

EEE46. Apparatus of EEE45, wherein
the uncompressed auxiliary audio information includes PCM data.

EEE47. Apparatus of EEE39, wherein
the packet type indicates an internal raw format, in particular a decoder-internal raw format.

EEE48. Apparatus of EEE39, further comprising:
a gain adjustment unit configured to perform gain adjustment applied to the side-data stream.

EEE49. Apparatus of EEE39, further comprising:
a time-alignment unit configured to perform time-alignment applied to the side-data stream.

EEE50. Apparatus of EEE39, further comprising:
an object renderer configured to perform object rendering applied to the side-data stream.

EEE51. Apparatus of EEE50, wherein
the object renderer is included in a primary decoder.

EEE52. Apparatus of EEE39, further comprising:
a format conversion unit configured to perform format conversion applied to the side-data stream.

EEE53. Apparatus of EEE39, further comprising:
a standardized MPEG-H 3D audio decoder for decoding the main stream.

EEE54. Apparatus of EEE39, wherein
the merged packetized media bitstream includes MHAS packets.

EEE55. An apparatus for audio signal processing, comprising:
a receiver configured to receive a main stream indicative of main audio information;
a local engine configured to generate, based on auxiliary audio information, an side-data stream indicative of the auxiliary audio information and/or a receiver configured to receive the side-data stream, and
a merger configured to merge the main stream and the side-data stream to generate a merged packetized media bitstream which includes packets associated with a main stream indicative of main audio information and packets associated with an side-data stream indicative of auxiliary audio information.

EEE56. Apparatus of EEE55, further comprising:
a packetizer configured to packetize media data indicative of the auxiliary audio information into packets of the format of the merged packetized media bitstream.

EEE57. A system including an apparatus of EEE55 and an apparatus of EEE39.

The invention claimed is:

1. An apparatus comprising:
   a receiver configured to receive a merged packetized media bitstream which includes packets associated with a main stream and packets associated with an auxiliary stream, wherein the main stream comprises MPEG-H 3D audio data encapsulated as packets in an MHAS format, and wherein the auxiliary stream comprises additional audio data encapsulated as packets in the MHAS format, wherein a format of a packet payload of the packets associated with the auxiliary stream is different from the MPEG-H 3D audio format, and time offset packets in the MHAS format signaling an indication of a time offset of the auxiliary stream to the main stream and having a same packet label number assigned as the MHAS packets carrying the additional audio data said time offset packets;
   a splitter configured to identify a packet type encapsulated in a header of the packets in the merged packetized media bitstream and configured to split, based on the identification of the packet type, the merged packetized media bitstream into the main stream and the auxiliary stream, wherein the packet types of the packets associated with the auxiliary stream are new MHAS packet types encapsulated in the packet header, wherein the new MHAS packet types are different from the MHAS packets, and
   a time-alignment unit for time-aligning the additional audio data with the main audio data based on the signaled time offset.

2. Apparatus according to claim 1, wherein the apparatus further comprises a primary decoder configured to decode the main stream according to the MPEG-H 3D audio format.

3. Apparatus according to claim 1, wherein the packets associated with the auxiliary stream include a sub-header identifying the format of the packet payload.

4. Apparatus according to claim 1, wherein the apparatus further comprises a secondary decoder configured to receive the auxiliary stream from the splitter and to decode the auxiliary stream according to said format being different from the MPEG-H 3D audio format.

5. Apparatus according to claim 1, wherein the output signals obtained from the main and auxiliary stream are output simultaneously to a listener.

6. The apparatus of claim 1, wherein the MHAS format is compatible to the ISO/IEC 23008-3 standard.

7. A method comprising:
   receiving a merged packetized media bitstream which includes packets associated with a main stream and packets associated with an auxiliary stream, wherein the main stream comprises MPEG-H 3D audio data encapsulated as packets in an MHAS format, and wherein the auxiliary stream comprises additional audio data encapsulated as packets in the MHAS format, wherein a format of a packet payload of the packets associated with the auxiliary stream is different from the MPEG-H 3D audio format, and time offset packets in the MHAS format signaling an indication of a time offset of the auxiliary stream to the main stream and having a same packet label number assigned as the MHAS packets carrying the additional audio data said time offset packets;
   identifying a packet type encapsulated in a header of the packets in the merged packetized media bitstream,
   splitting, based on the identification of the packet type, the merged packetized media bitstream into the main stream and the auxiliary stream, wherein the packet types of the packets associated with the auxiliary stream are new MHAS packet types encapsulated in the packet header, wherein the new MHAS packet types are different from the MHAS packets, and
   time-aligning the additional audio data with the main audio data based on the signaled time offset.

8. Method according to claim 7, wherein the method further comprises decoding according to the MPEG-H 3D audio format, by a primary decoder, the main stream splitted from the merged packetized media bitstream.

9. Method according to claim 7, wherein the packets associated with the auxiliary stream include a sub-header identifying the format of the packet payload.

10. Method according to claim 7, wherein the method further comprises decoding, by a secondary decoder, the auxiliary stream splitted from the merged packetized bitstream according to said format being different from the MPEG-H 3D audio format.

11. Method according to claim 7, wherein the method further comprises outputting signals obtained from the main and auxiliary stream simultaneously to a listener.

12. The method of claim 7, wherein the MHAS format is compatible to the ISO/IEC 23008-3 standard.

13. An apparatus comprising:
   an MPEG-H 3D Audio Core decoder configured to create audio data based on packets associated with a main stream of a merged packetized media bitstream comprising main MPEG-H 3D audio data encapsulated as packets in an MHAS format;
   a format conversion unit configured to perform format conversion on additional audio data encapsulated as packets associated with an auxiliary stream of the merged packetized media bitstream, based on the identification of a packet type, wherein the packets are of a new MHAS packet type encapsulated in a header of the packets, wherein the new MHAS packet type is different from the MHAS format;
   a sample rate converter configured to convert the sample rate of the additional audio data encapsulated in said packets; and optionally
   a mixer configured to mix audio data created by the MPEG-H 3D Audio Core decoder and the audio data output by the sample rate converter.

14. The apparatus of claim 13, wherein the MHAS format is compatible to the ISO/IEC 23008-3 standard.

15. An apparatus comprising:
   an MPEG-H 3D Audio Core decoder configured to create audio data based on packets associated with a main stream of a merged packetized media bitstream comprising main MPEG-H 3D audio data encapsulated as packets in an MHAS format;
   an additional decoder comprising means to decode additional audio data encapsulated as packets associated with an auxiliary stream in the merged packetized media bitstream, based on the identification of a packet type encapsulated in a header of the packets, wherein the packet type is a new MHAS type different from the MHAS format which cannot be decoded by the standardized MPEG-H 3D Audio Core decoder and which indicates a format of the packet payload;
a format conversion unit configured to perform format conversion on additional audio data encapsulated in said packets;
a sample rate converter configured to convert the sample rate of the additional audio data encapsulated in said packets; and optionally a mixer configured to mix audio data created by the MPEG-H 3D Audio Core decoder and the audio data output by the sample rate converter.

16. The apparatus according to claim 15, wherein the additional decoder is further configured to receive information regarding mixing of the auxiliary stream with the main stream.

17. The apparatus according to claim 16, wherein the mixing information relates to at least one of static gain(s) or dynamic gain(s) to perform gain adjustment of the additional audio data.

18. The apparatus of claim 15, wherein the MHAS format is compatible to the ISO/IEC 23008-3 standard.

* * * * *

UNITED STATES PATENT AND TRADEMARK OFFICE
CERTIFICATE OF CORRECTION

| | |
|---|---|
| PATENT NO. | : 11,232,805 B2 |
| APPLICATION NO. | : 16/970968 |
| DATED | : January 25, 2022 |
| INVENTOR(S) | : Stephan Schreiner et al. |

It is certified that error appears in the above-identified patent and that said Letters Patent is hereby corrected as shown below:

On the Title Page

Column 2, item (56) Other Publications, Line 2, Delete "Worksop" and insert --Workshop--.

In the Claims

Column 11, Claim 2, Line 39, delete "Apparatus according" and insert --The apparatus according--.

Column 11, Claim 3, Line 42, delete "Apparatus" and insert --The apparatus--.

Column 11, Claim 4, Line 45, delete "Apparatus according" and insert --The apparatus according--.

Column 11, Claim 5, Line 50, delete "Apparatus" and insert --The apparatus--.

Column 12, Claim 8, Line 16, delete "Method according" and insert --The method according--.

Column 12, Claim 9, Line 20, delete "Method" and insert --The method--.

Column 12, Claim 10, Line 23, delete "Method according" and insert --The method according--.

Column 12, Claim 11, Line 28, delete "Method according" and insert --The method according--.

Column 13, Claim 15, Line 8, after "optionally", insert --¶--.

Signed and Sealed this
Twenty-ninth Day of October, 2024

*Katherine Kelly Vidal*

Katherine Kelly Vidal
*Director of the United States Patent and Trademark Office*